(12) United States Patent
Mina (10) Patent No.: US 9,219,633 B2
(45) Date of Patent: Dec. 22, 2015

(54) RECIPE EXCHANGE AND MANAGEMENT SYSTEM

(71) Applicant: Mina Group LLC, San Francisco, CA (US)

(72) Inventor: Ashraf Michael Mina, San Francisco, CA (US)

(73) Assignee: Mina Group LLC, San Francisco, CA (US)

( * ) Notice: Subject to any disclaimer, the term of this patent is extended or adjusted under 35 U.S.C. 154(b) by 194 days.

(21) Appl. No.: 13/649,032

(22) Filed: Oct. 10, 2012

(65) Prior Publication Data

US 2014/0101233 A1    Apr. 10, 2014

(51) Int. Cl.
*H04L 29/06* (2006.01)
*G06Q 50/12* (2012.01)

(52) U.S. Cl.
CPC .......... *H04L 29/06047* (2013.01); *G06Q 50/12* (2013.01)

(58) Field of Classification Search
CPC ....... G06F 3/048; G06F 3/0482; G06F 17/30; G06F 17/30864; G06F 17/3089; G06Q 50/12; G06Q 10/087; H04L 29/06; H04L 29/06047; H04L 67/02
See application file for complete search history.

(56) References Cited

U.S. PATENT DOCUMENTS

| | | | |
|---|---|---|---|
| 2002/0026363 A1* | 2/2002 | Dunaway, Jr. | 705/15 |
| 2008/0172446 A1* | 7/2008 | Donovan et al. | 709/202 |
| 2009/0258331 A1* | 10/2009 | Do et al. | 434/127 |
| 2010/0030661 A1* | 2/2010 | Friedland et al. | 705/27 |
| 2010/0036694 A1* | 2/2010 | Schroeder et al. | 705/7 |
| 2010/0153201 A1* | 6/2010 | De Rubertis et al. | 705/14.19 |
| 2012/0096087 A1* | 4/2012 | Curcelli | 709/204 |
| 2012/0317505 A1* | 12/2012 | Schwartz et al. | 715/764 |
| 2013/0090959 A1* | 4/2013 | Kvamme et al. | 705/5 |

* cited by examiner

*Primary Examiner* — Brian J Gillis
*Assistant Examiner* — Gil H. Lee
(74) *Attorney, Agent, or Firm* — Lewis Roca Rothgerber LLP (57) ABSTRACT

A recipe exchange and management system is provided for a group of related restaurants. The system may be implemented as a network service that provides a series of interfaces or web pages to implement recipe creation, recipe sharing, and recipe and menu management. Users of the system may login with a username and password to access recipe data and menu data of any of two or more restaurants supported by the network service. A recipe may be created by a first user and reviewed by one or more second users of the service. A user associated with a first restaurant of the group of restaurants may access a recipe associated with a second restaurant of the group of restaurants.

18 Claims, 10 Drawing Sheets

| Ceasar Salad | Print | Copy to Menu Change Form | Email Recipe |

Images

Ceasar Salad
View image

530

Ceasar Salad
View image

530

Videos

Ceasar Salad
View video 540    550

Ingredients and Components

| Name | Amt | Unit |
|---|---|---|
| Romaine Lettuces | 4 | ea |
| Onion | 2 | g |
| Parmesan | 2 | g |
| + Caesar dressing | 10 | g |
| + Garlic croutons  560 | 2 | |

Restaurant Associations

Restaurant B          Approved: 2/14/12

RECIPE INFORMATION — 570

Exact Menu Wording Title:
  Romain Salad
Exact Menu Wording Descriptive:
  Garlic Crouton, Caesar dressing
Recipe Type:
  Dinner Salads
Menu Price $:
  $15.00
Item Cost $:
  $5.00
Item Cost %:
  33.3%
Proposed Components:
  Caesar Dressing
Chef Notes:
  Toss salad with dressing, add croutons
Chef Link:
  http://www.link.com
Method and Notes:
  1. Dress greens.
  2. Toss salad.
  3. Garnish with croutons
Wine Recommendation:
  ABC Sauvignon Blanc, Napa Valley 2011. Wine is light, crisp.
Delivery Verbiage:
  Romain Salad with Caesar Dressing and Garlic Croutons.
Allergy:
  Onion, garlic, dairy
Marking:
  App fork and Knife

RECIPE EXCHANGE AND MANAGEMENT SYSTEM

BACKGROUND

Restaurant chains such as Kentucky Fried Chicken® typically provide the exact same menu at each and every franchise location. To maintain a consistent product, fast food chains typically create recipes at a central location and provide the recipe to each individual franchise. As such, each and every franchise restaurant will have the exact same menu and recipe. The process of providing each and every franchise restaurant with the same centrally devised menu works well for restaurant chains in which each franchise provides the exact same product at a low cost. The franchise formula for maintaining identical menus, however, does not carry over to restaurants having separate identities and themes. Additionally, restaurants which provide a fine dining experience provide menus that are not only individualized but also require more skill and training than that typically required of a fast food franchise restaurant.

SUMMARY

A recipe exchange and management system is provided for a group of related culinary entities, such as restaurants, culinary groups, and events. The entities, such as restaurants, may be related in that they are owned by the same company or are otherwise linked. The system may be implemented as a network service. The service may provide a series of interfaces or web pages to implement recipe creation, recipe sharing, and recipe and menu management. Users of the system may login with a username and password to access recipe data and menu data of any of two or more restaurants supported by the network service. The recipe exchange and management system may be used to maintain quality control and for teaching purposes for restaurants which decide to use a recipe created for another restaurant. The recipe exchange and management system may be used to create recipe by a first author. Recipe creation may include recipe review by one or more second users and feedback for the recipe. A recipe may be shared between multiple restaurants through the recipe exchange and management system. A user associated with a first restaurant of the group of restaurants may access a recipe associated with a second restaurant of the group of restaurants.

In an embodiment, a method for exchanging recipe information may begin with receiving recipe data from a first client by a server. The recipe data may be associated with a recipe used by a first restaurant of a plurality of restaurants. The recipe data may be stored by the server. A request may be received for the recipe data from a second client associated with a second restaurant of the plurality of restaurants. The recipe data may be transmitted to the second client.

In an embodiment, a method for creating a recipe may begin with receiving recipe data from a first user for at least one of a plurality of restaurants. Feedback may be received for the recipe data from a second user. The recipe data may be modified based on the feedback. The modified recipe data may be stored for at least one of the plurality of restaurants.

DETAILED DESCRIPTION

A recipe exchange and management system is provided for a group of related culinary entities, such as restaurants, culinary groups, and events. Though restaurants are discussed herein for purposes of discussion, other entities may be used with the present technology. For entities such as restaurants, the restaurants may be related in that they are owned by the same company or are otherwise linked. The system may be implemented as a network service. The service may provide a series of interfaces or web pages to implement recipe creation, recipe sharing, and recipe and menu management. Users of the system may login with a username and password to access recipe data and menu data of any of two or more restaurants supported by the network service. The recipe exchange and management system may be used to maintain quality control and for teaching purposes for restaurants which decide to use a recipe created for another restaurant.

The recipe exchange and management system may be used to create recipe. To create a recipe, new recipe data is received by a server from a user via a client device. The recipe may include ingredients, a title, cost information, steps for following the recipe and other information. The recipe may be put in a review queue until further review by a recipe reviewer. The recipe may be reviewed by one or more people. The recipe may be reviewed by someone invited by the recipe author to review the recipe or someone automatically designated to review the recipe. Feedback may be provided for the recipe and the recipe may be modified. If accepted, the recipe may replace a current recipe within a restaurant menu. If a recipe is replaced, the recipe is automatically moved to the archived recipes for that particular restaurant. Recipe creation is described in more detail below.

A recipe may be shared through the recipe exchange and management system. A user associated with a first restaurant of the group of restaurants may access a recipe associated with a second restaurant of the group of restaurants. The recipe may be an active recipe, a draft recipe not yet finalized, or an archived recipe. The user from the second restaurant may view the receipt through a system interface, print the recipe, email the recipe, and view images and videos relating to the recipe. Recipe sharing is described in more detail below.

Figure 1:
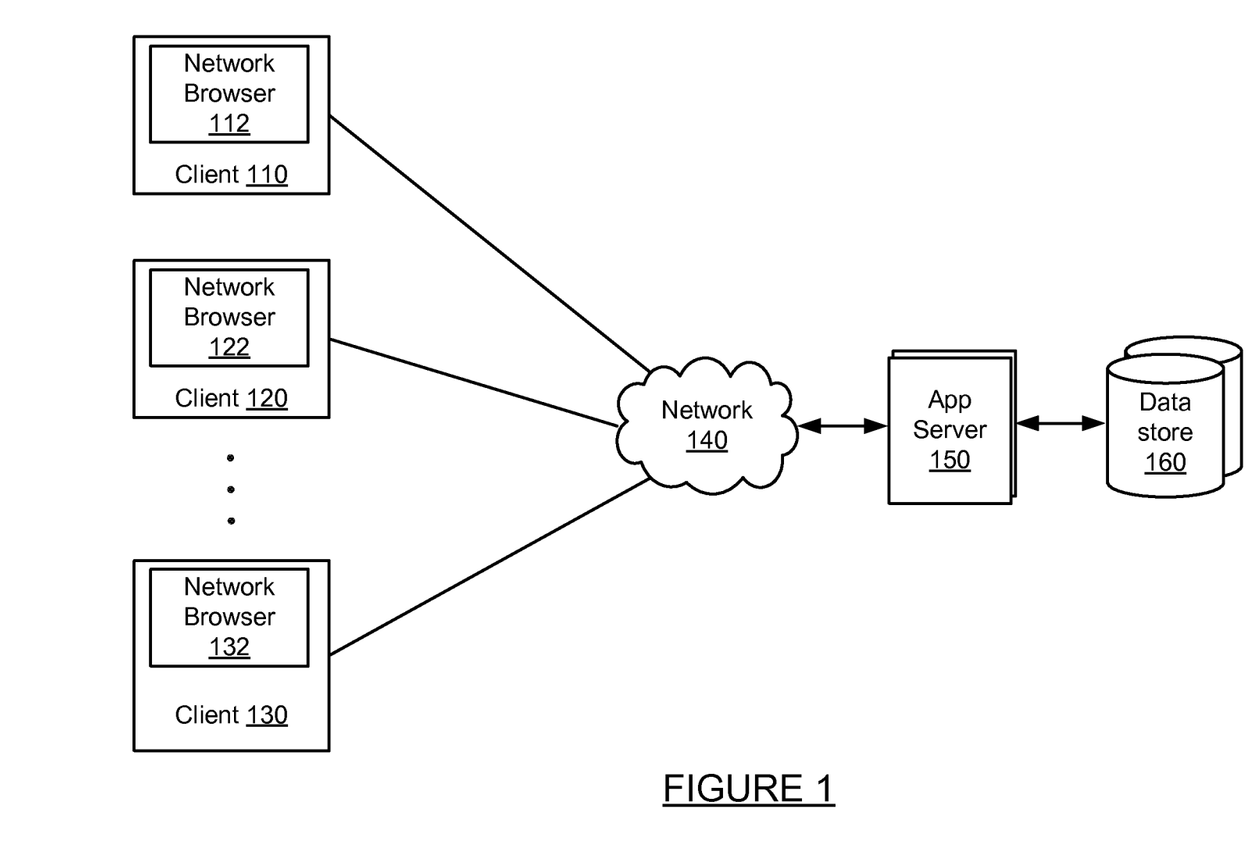
FIG. 1 is a block diagram of an exemplary recipe exchange and management system.

FIG. 1 is a block diagram of an exemplary recipe exchange and management system. The system of FIG. 1 includes clients 110, 120, and 130, application server 150 and data store 160. Clients 110-130 may communicate with application server 150 over network 140. Network 140 may be implemented as a private network, public network, WAN, LAN, an intranet, the Internet, or a combination of these networks.

Each of clients 110, 120 and 130 may be implemented as a desktop, laptop, notebook, tablet computer, smart phone, or some other computing device. Client 110 includes network browser 112. Network browser 112 may include an application executable to receive content page data from network 140, render the data, provide an interface as a network page, and communicate with application server 150. In some embodiments, the network page may be implemented as a web page. Clients 120 and 130 may also include network browsers 122 and 132 which provide network pages similar to those provided by network browser 112. In some embodiments, network browsers 112-132 may provide interfaces such as those discussed with reference to FIGS. 2-7.

Each of clients 110-130 may be associated with a different restaurant. Client 110, for example may be used by a user employed at a first restaurant while client 120 may be used by an employee of a second restaurant. Each of the restaurants, however, may be associated with a restaurant group, for example a collection of restaurants owned by a single company. The restaurants may have different names and different menus, but may still be managed or operated within the restaurant group.

The system of FIG. 1 provides restaurant menus and recipe management services over a network 140. The recipes and menus may be provided and managed for a plurality of related restaurants. Application server 150 may communicate with network 140 and provide a network service for managing and exchanging recipes and other restaurant information. Application server 150 may include one or more servers, such as one or more web servers for processing communication with network 140 and one or more application servers for processing requests and providing web content over network 140.

Application server 150 may be in communication with one or more data stores 160. Data stores 160 may store information related to the recipe exchange and management system. Some of the data may include recipe data, menu data, user account data, and other data.

To access the network service provided by application server 150, a user may have an account with the service. A user account may include user data such as a user name, password, contact information, a position, and a permission level. The position may include the title of the user's job or duties at restaurant. Examples of positions include sous chef, executive chef, general manager, hostess, maitre d', busboy, and other positions. The permissions may indicate a level of access that a particular user may have to data maintained by the network service. A particular position may be associated with a particular permission. In some embodiments, different instances of particular positions may have different permissions.

Once an account is created, a user may log into the account by providing a user name and password to an initial login screen. The received user name and password is compared to user account information stored in data store 160. If the submitted user name and password match a stored username and associated password, the user may be allowed to navigate through a series of interfaces and/or web pages provided by the network service. The interfaces/web pages may allow the user to access recipes for restaurants within the restaurant group, restaurant menus, and other data. If the username and password do not match, access to the service is denied to the user.

Figure 2:
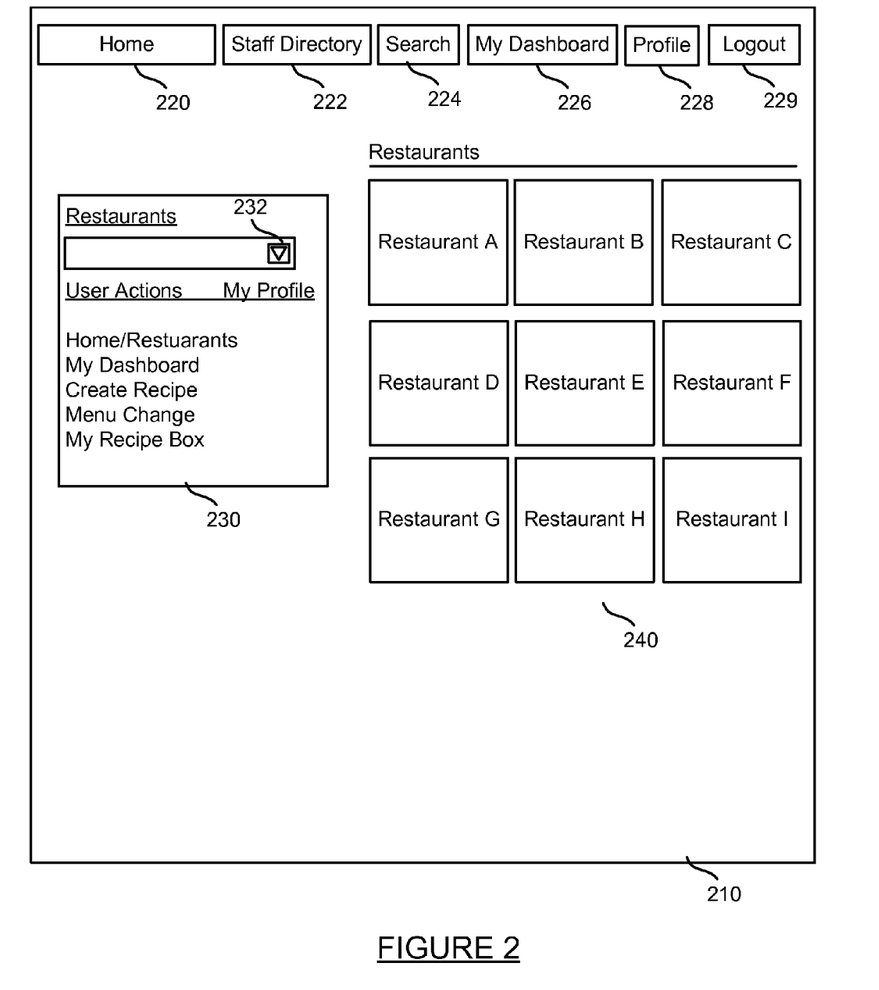
FIG. 2 is an exemplary interface for a recipe exchange home page.

FIG. 2 is an exemplary interface for a recipe exchange home page. Home page 210 includes an interface provided as part of a network service for exchanging and managing recipe data. In some embodiments, the interface is provided as a web page through a content browser, such as content browsers 112-132. Home page 210 may include a series of selectable links near the top of the page, restaurant information and user action information towards the left of the page, and selectable restaurant links toward the right of the page.

Across the top of the home page 210 are selectable header links home 220, staff directory 222, search 224, my dashboard 226, profile 228 and logout 229. A selectable link may be a text, graphic, or other content that, when selected, provides new content in at least a portion of or all of a current page. The home link 220 is a selectable link that navigates users back to home page 210 regardless of what page they are currently on.

Staff directory link 222, when selected, provides a list of staff for all the restaurants, management and other personnel working for the restaurant company. In some embodiments, the list of staff provided is based upon the role and permission of the user currently logged into the system. Search link 224 provides a search box for receiving search terms provided by a user. Upon receiving the search terms, the system will search for content within the network service that matches the search terms. In some embodiments, the search may be used to find recipes managed by the service. For example, a search for "salmon" will return all recipes that include the word salmon in the content associated with that recipe.

The "My dashboard" link 226 provides a dashboard for the current user. The dashboard may be an interface providing information to a user, such as actions to be taken by the user and notifications. A dashboard is discussed in more detail below with respect to the interface of FIG. 6. Profile link 228 directs a user to a profile page having user account information. A profile page is discussed in more detail below with respect to the interface of FIG. 7. Logout link 229 logs the user out from the system upon being selected.

Window 230 of home page 210 provides restaurant information and user action information. The restaurant information is provided as a drop down menu 232 for selecting a particular restaurant. To select a restaurant, the user would select the drop down menu icon to show a list of restaurants in the restaurant group. The user would then select a restaurant that is shown in a list of restaurants for to view the restaurant page for the restaurants. Also in window 230 is a list of user actions. The user actions may include actions that the user may perform based on the user's permission level. The actions may include, depending on the permission level, returning to a home page, user's dashboard, create recipe, menu change, and to user's recipe box. In some embodiments, only users with a certain permission level will be able to create recipes, change menus, and have access to a recipe box. The "My profile" link within window 230 provides a user profile page, similar to profile link 228 at the top of home page 210.

The restaurant icon area 240 includes selectable icons for each restaurant within the group of restaurants linked to the recipe exchange and management network service. The icons may include text or graphics that provide the restaurant name, restaurant logo, and other data that identifies the restaurant. When selected, each icon link provides a restaurant page for the selected restaurant. For example, selecting the icon for Restaurant B will result in display of a restaurant page for Restaurant B.

In some embodiments, an indicator may be displayed with respect to a restaurant when a new video, new recipe, or other development occurs with respect to a restaurant. The indicator may be flag, highlight, or other media indicator. The indicator may automatically expire after a period of time. For example, a new flag may be superimposed on the restaurant if a new recipe was approved for the restaurant within the last fifteen days.

Figure 3:
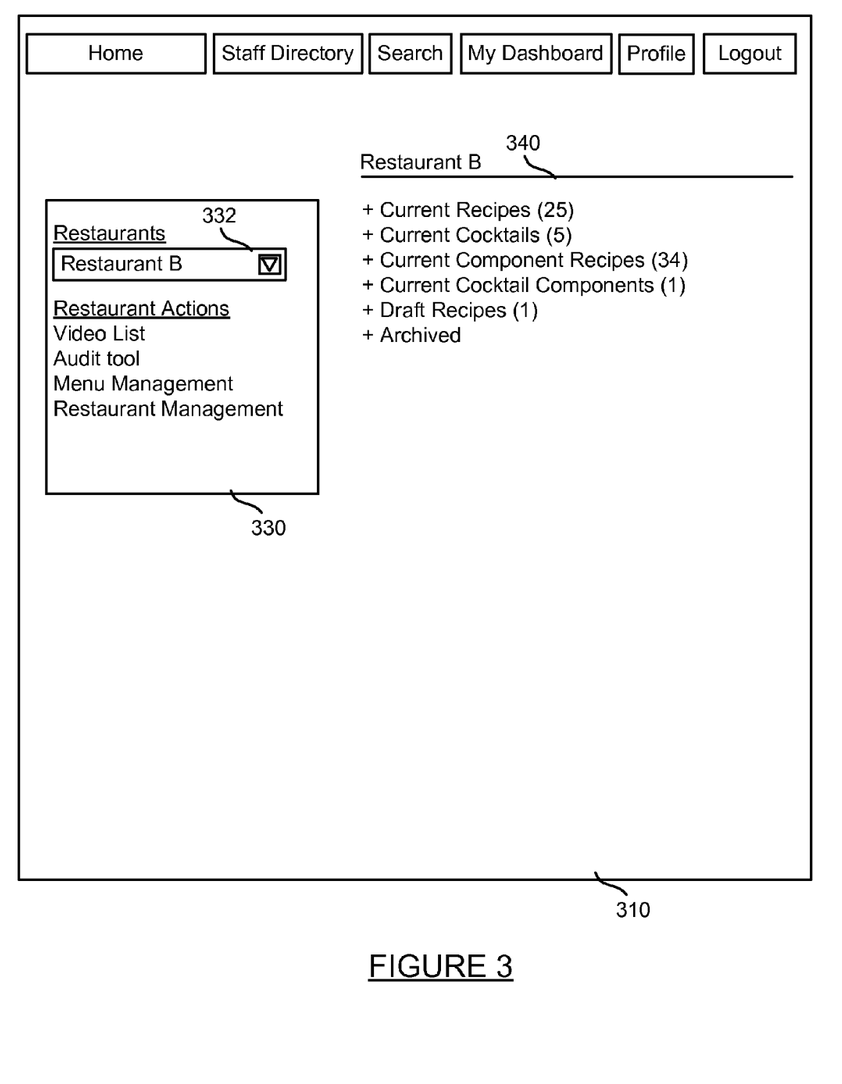
FIG. 3 is an exemplary interface for a recipe exchange restaurant page.

FIG. 3 is an exemplary interface for a recipe exchange restaurant page. The restaurant page of FIG. 3 includes selectable header links at the top of the page as shown in home page 210, a list of available restaurant actions towards the left of the page in window 330, and a restaurant menu 340. Window 330 identifies the selected restaurant within the drop down menu 332. In restaurant page 310, the selected restaurant is "Restaurant B." Also within window 330 are lists of restaurant actions that may be taken for the logged in user. The particular actions available to a user may be based on the user's permission level. The actions displayed include video list, an audit tool, menu management, and restaurant management. The video lists link, when selected, provides a list of videos associated with the recipes for the particular restaurant. The audit tool is an administration tool to audit and control content for the restaurant. The menu management link may be used for uploading menu and recipe data for the current restaurant. The restaurant management link may allow an administrator to manage the people at the restaurant. For example, the restaurant management link may allow an administrator to update a list of current employees and their corresponding positions for a particular restaurant.

Menu area 340 includes the menu and other recipe information for the selected restaurant. The particular restaurant for the menu is identified above menu, identified as "Restaurant B". A collection of recipes makes up the menu for the particular restaurant. Within window 340, the collection of recipes includes current recipes, current cocktails, current component recipes, current cocktail components, draft recipes and archive recipes. Current recipes may be recipes currently in use by the restaurant. Current cocktails may include a list of cocktails currently in use by the restaurant. Component recipes may include sub recipes used as a building block to provide a portion of a current recipe. Current cocktail components are a subcomponent of a cocktail recipe. Draft recipes are recipes that are not yet used by the restaurant but still in the creation process. Archived recipes are recipes not used by the restaurant, for examples recipes that have been replaced by a new recipe. Each collection of recipes may be selected to provide an expanded list of recipes.

A recipe exchange restaurant page may include additional features, such as an education module, document module and event manager module. The education module may be displayed for manager-level user roles and be used to create, administer and manage tests, quizzes, and other educational training tools. The educational training tools may be used to provide online and other training and ongoing education exercises and projects for restaurant personnel.

A document module may provide for uploading, sorting, archiving and management of various documentation, including but not limited to operational documents, manuals, and spreadsheets. An event manager module may allow users to enter, track and manage banquet and event orders, including checklists, customer information, relevant forms, menu planners, and staff schedulers. The event manager may provide users with the ability to export and share data with partners and third parties without granting them access to the recipe exchange system.

Figure 4:
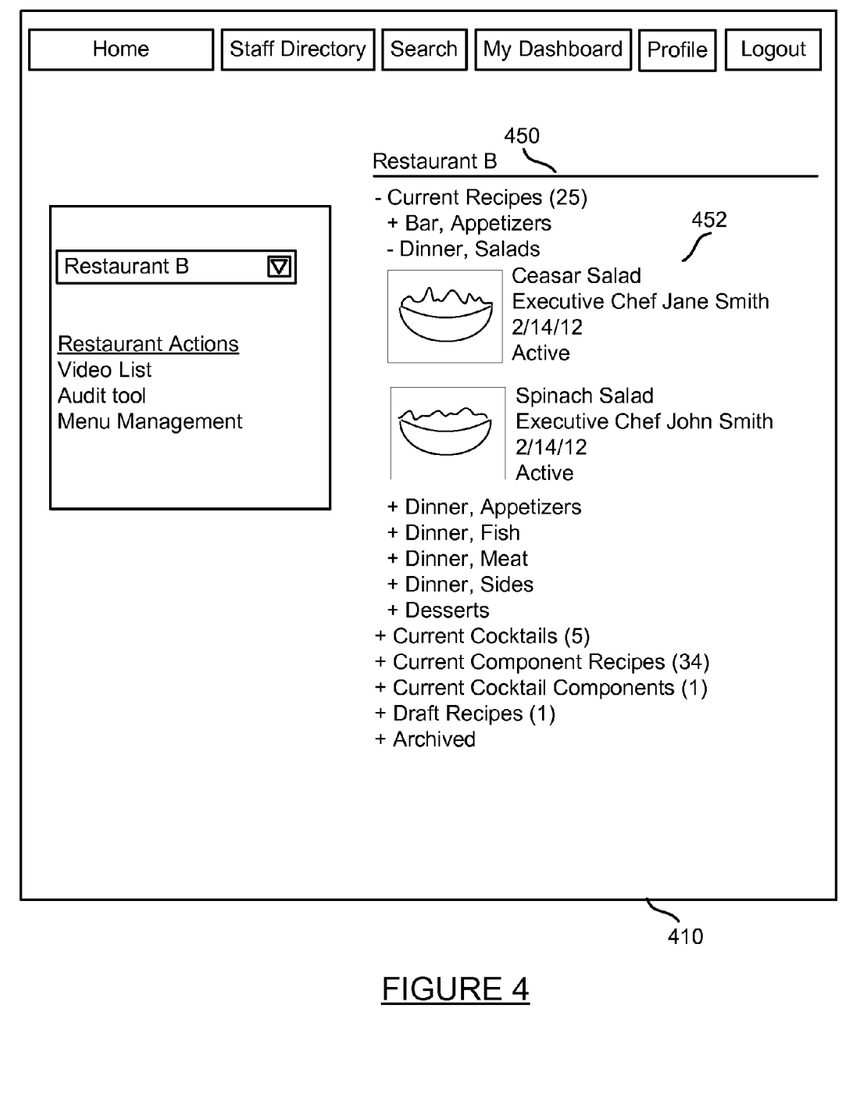
FIG. 4 is an exemplary interface for an expanded restaurant page.

FIG. 4 is an exemplary interface for an expanded restaurant page. The expanded restaurant page 410 is similar to restaurant page 310 of FIG. 3 except that the current recipes collection has been selected for expansion. The list of recipes under current recipes includes bar appetizers, dinner salads, dinner appetizers, dinner fish, dinner meat, dinner sides and desserts. Within those collections of recipes, the dinner salads recipe has been further selected for expansion. As shown, dinner salad recipes include a recipe for Caesar salad and for spinach salad. Summary information for each recipe is provided, such as the name of the recipe, recipe author, the recipe acceptance date and the current status of the recipe. For example, for the Caesar salad recipe, the full name is Caesar salad, the author is executive chef Jane Smith, the recipe was accepted on Feb. 14, 2012, and the recipe has an active state. Similarly, the spinach salad recipe was authorized by executive chef John Smith, accepted on Feb. 14, 2012, and is also active. Each of recipe summary information 450 and 452 may be selected to provide more information for each recipe.

In some embodiments, when a photo is selected by user input, information is provided to the user through the interface. For example, if a cursor is placed over a photo, a title and description may be displayed in the interface.

Figure 5:
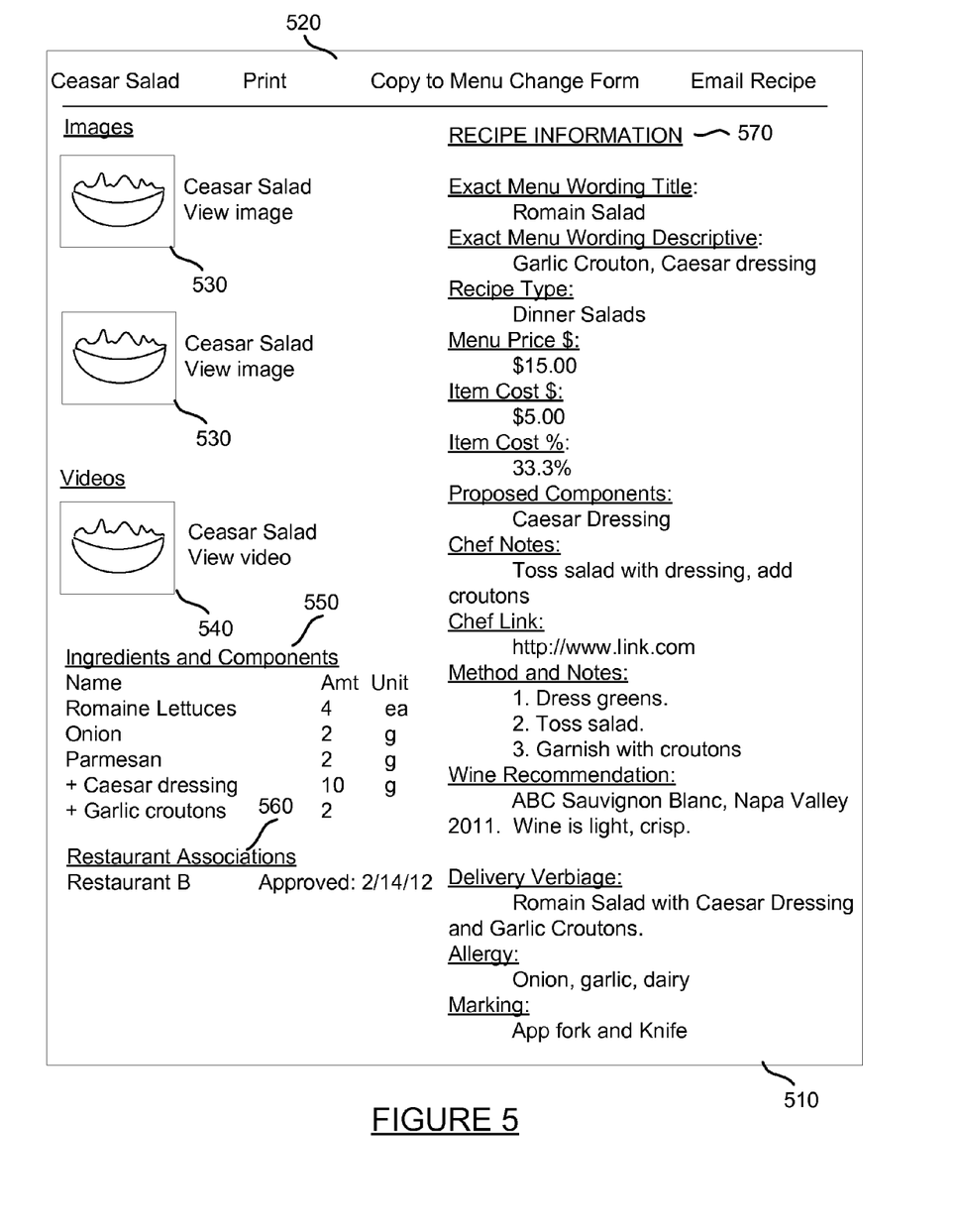
FIG. 5 is an exemplary interface for a recipe exchange recipe page.

FIG. 5 is an exemplary interface for a recipe page. A recipe page is provided upon selection of a recipe provided in an expanded restaurant page such as page 410. Recipe page 510 is provided in response to receiving a selection of recipe summary information 452, corresponding to a Caesar salad.

Recipe page 510 includes header area 520, images 530, videos 540, ingredient and component data 550, restaurant associations 560, and recipe information 570. Header 520 includes the full name of the recipe, a selectable button for printing the recipe, a selectable button for copying the recipe data to a menu change form, and a selectable button for emailing the recipe. The copy menu allows a user to copy the recipe information to a menu change form, creating a template for creating a new recipe from the current recipe data. The data from the recipe may be auto-filled into forms for creating a new recipe.

Images 530 may include one or more images of the dish made by the recipe. Videos 540 may include one or more videos for making and presenting the dish according to the recipe. Ingredients and components 550 may include the name, amount and unit for each ingredient for the recipe. As shown, the ingredients may include individual ingredients as well as component recipes used to make the current recipe. Each component recipe may be expandable within the ingredient and component listing. Restaurant association 560 may indicate the one or more restaurants the recipe is their menu and the date the recipe was approved for use for the restaurant.

Recipe information 570 includes a variety of information for the particular recipe. The information may include the exact menu wording title and the exact menu wording descriptive for the recipe. The title and descriptive are used in menus printed for a restaurant that includes the recipe dish. For example, in interface 510, the title is "Caesar Salad" and the descriptive is "garlic croutons, Caesar dressing".

Recipe information 570 may also include a recipe type, menu price, item costs, and item cost percentage. The recipe type indicates what sub area of a menu the recipe appears in, such as "dinner salad". The menu price is the price charged for the particular dish while the item cost is the actual cost to the restaurant. The item cost percentage is the percentage of the item costs to the menu costs, which may be used to determine the business feasibility of the recipe.

Recipe information may also include proposed components, chef notes, a chef link, and method and notes. The proposed components include a list of components listed as part of the recipe. Chef notes include points to keep in mind for chefs preparing the recipe. A chef link may include a link with more information for a particular ingredient or other information for the recipe. The method and notes may include instructions for performing the recipe. Within recipe page 510, the notes indicate the salad should be tossed with the dressing and then croutons should be added.

Recipe information 570 may also include a wine recommendation, delivery verbiage, allergy and marking for the recipe dish. The wine recommendation is a particular wine that may be recommended with the dish and characteristics of the wine. Delivery verbiage includes what a server should tell a guest as the dish is provided to the guest. Allergy information includes a list of ingredients for which allergies may be relevant to the dish. Marking information may include particular utensils that should be provided to a guest who orders the dish.

Once a recipe is created, it may be accessed and shared by users with access to the restaurant for which the recipe was made. When a recipe is copied and submitted to a new restaurant, the submitted recipe data may include the ingredients as well as embedded photos and video. In some embodiments, each recipe may include a media submit selectable input button, which submits the media associated with the recipe. This provides for easy and complete submission of the recipe to the restaurant by a user.

Figure 6:
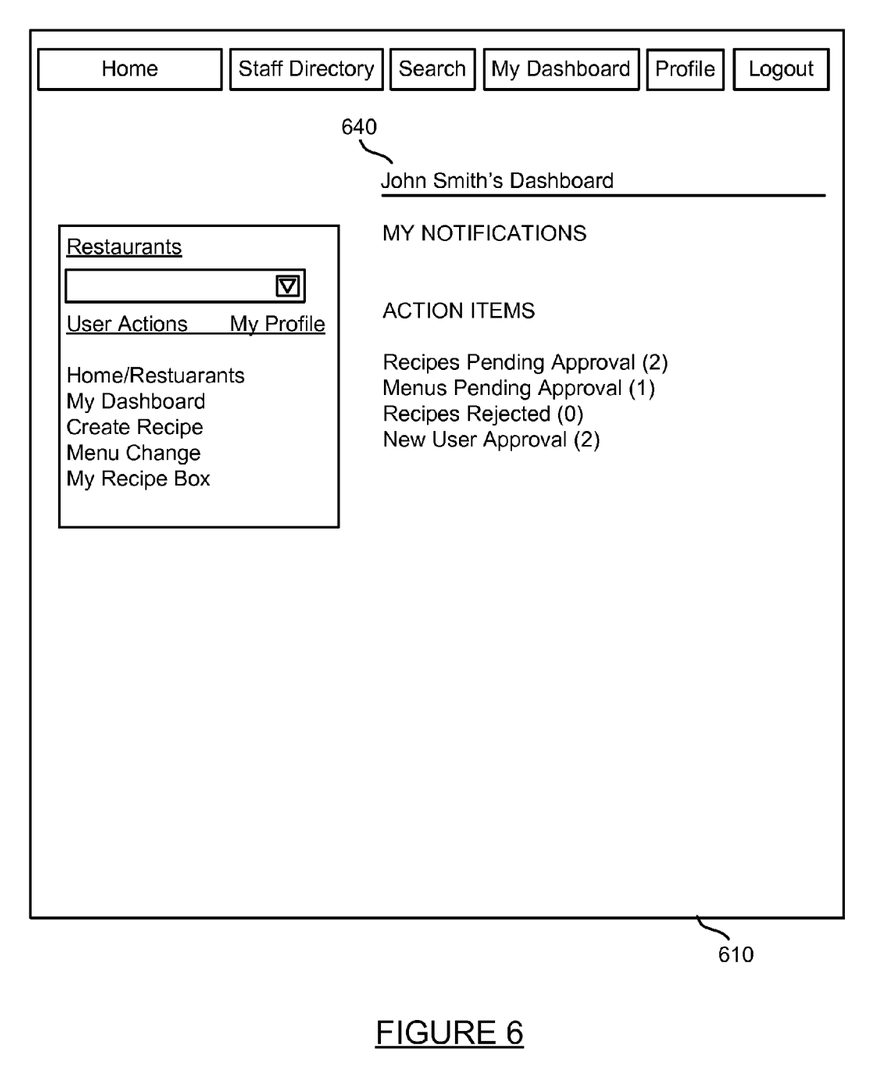
FIG. 6 is an exemplary interface for a dashboard.

FIG. 6 is an exemplary interface for a dashboard. The dashboard of interface 610 is provided upon selection of the "My Dashboard" link in the selectable header links. The dashboard may include notifications and action items as well as a user's dashboard identifier within dashboard area 640. The action items may include recipes pending approval for the user, menus pending approval, recipes rejected, and new user approvals. Also within the administrative dashboard may include links for user management, user access management, restaurant management, restaurant position management, restaurant group management, menu type management, recipe type management, recipe affiliation management, and feedback data.

User management may provide a list of users, when they were last active, as well as the total recipes for each user. An administrator may edit the name, contact information, position, and permissions for a particular user. Examples of positions may include executive chef, sous chef, VIP guest, general manager, corporate, administrator, and other roles. User access management may indicate available positions and a corresponding permission. Selecting the user access management link may also allow an administrator to change the positions and add new positions having a corresponding permission. Restaurant management link may allow administrator to change general data for a restaurant, such as the restaurant name, logo, cost information, as well as adding and deleting a restaurant. Restaurant position management may allow a user to change restaurant positions, such as add a position from a particular restaurant or remove a position from a particular restaurant. In some embodiments, a restaurant management screen may be shown for a general manager role for a particular restaurant.

Several actions may be assigned for various positions. These actions may include submitting a new recipe, assign user positions, remove a user form, approve recipes, upload menus, view recipes with or without costs, approve position requests, manage email lists, view videos and unachieved recipes.

One action may include uploading of a menu. A user with the appropriate permissions may upload a menu to a restaurant. A menu may also be uploaded for processing through a menu approval process. The menu may be uploaded or received through a content management system connection or feed.

A link for restaurant group management may allow a user to manage a group of restaurants under a common name. A link for menu type and management may allow user to assign a menu type when uploading a menu, as well as creating and editing categories. A link for recipe type management may allow user to edit recipe categories. Recipe categories may include dinner, lunch, and so forth. A user may create and edit the categories using this link. Recipe affiliation management may be available for a creator, reviewer, or co-creator and collaboration roles to be managed. Feedback data, when selected, may enable a user to provide notes from a feedback panel, the notes may include a name, email, feedback detail, and other data for suggesting improvements, fixing glitches, and other feedback for a recipe.

In some embodiments, a dashboard or administrative panel within a dashboard may include an ingredient management action. The ingredient management action may enable a user to add, delete, change, modify or otherwise edit ingredients. The ingredients themselves and the order in which they appear may be edited through the ingredient management action. This action may change how ingredients appear in data store 160 and may keep drop down menus more simplified and cleaner.

A user's dashboard may include information retrieved from outside the network of restaurants. For example, information such as financials, news, inventory data, pricing and labor reports may be provided in a user dashboard. The information may be retrieved via data queries to external systems through an API. The retrieved information may then be channeled to one or more user dashboards, and other portions interfaces provided by the technology herein, based on administrator set preferences and user preferences.

A user may also create reports from their dashboard. The reports may provide information for a variety of data, including but not limited to user statistics, menu completion audits, cost analysis, team rosters, restaurant level staff usage, and other data. The reports may provide data on a particular user, a restaurant, group of users, group of restaurants, or other set of data.

Figure 7:
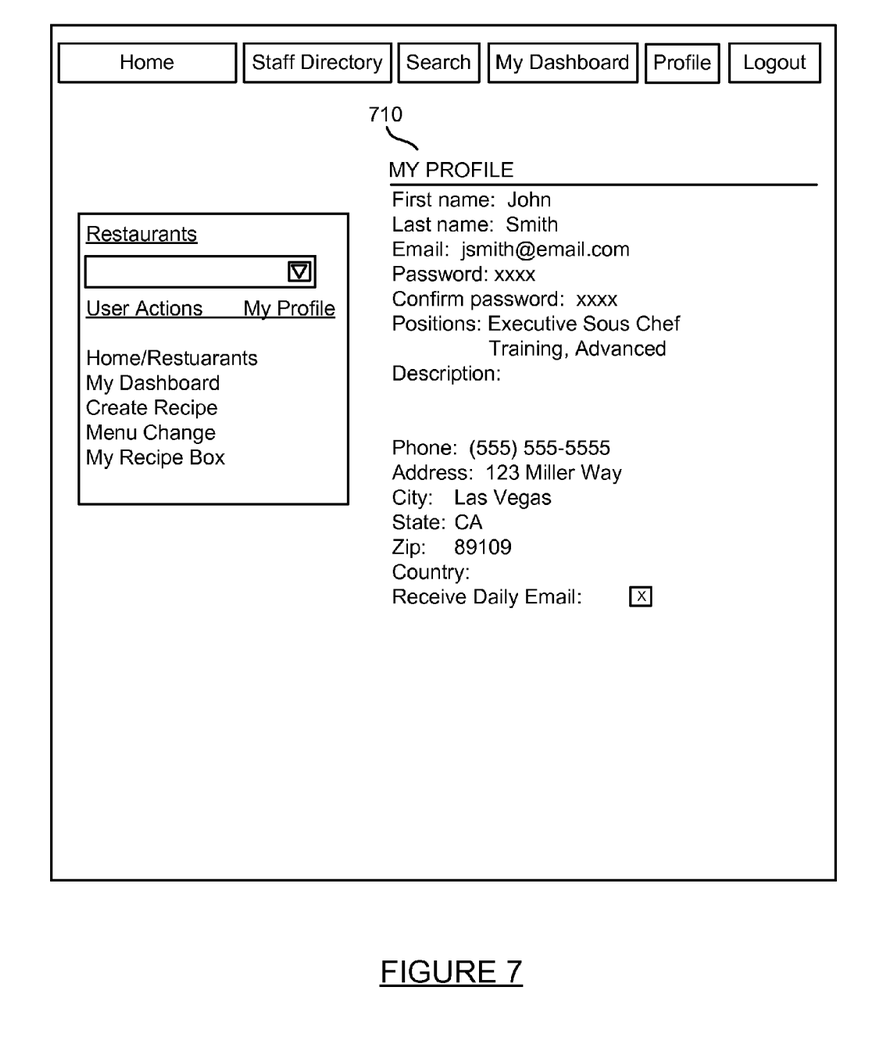
FIG. 7 is an exemplary interface for a user profile.

FIG. 7 is an exemplary interface providing a user profile. The user profile 710 may provide information such as user's name, email, phone and address information. The profile may also include user name and password information, as well as positions associated with the particular user. The profile may also indicate whether the user will receive a daily email of notifications and actions such as those provided in the user's dashboard.

A user may configure one or more parameters for receiving notifications. The notifications may relate to activity regarding the user's dashboard, daily email, and other events with respect to the network service provided by the present technology. The alerts may be provided by email, SMS, and other known forms of electronic alerts. The alerts may improve transparency and visibility as to approvals, edits, changes, new media uploads, and other events for the user.

Figure 8:
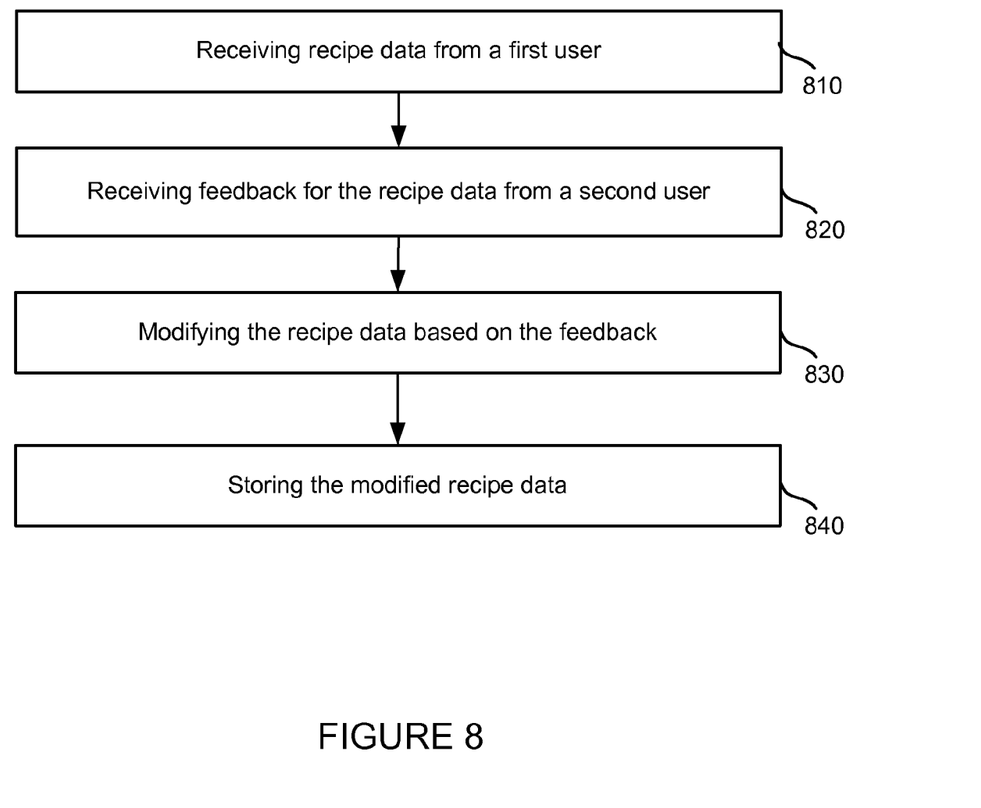
FIG. 8 is an exemplary method for creating a recipe.

FIG. 8 is an exemplary method for creating a recipe. First, recipe data is received from a first user at step 810. The recipe may be associated with a first restaurant and may be received from a client by a server. Next, feedback may be received for the recipe data from a second user at step 820. Some users may review recipe data and provide feedback. The feedback may include accepting, rejecting, modifying, offering notes, or requesting more information for the recipe. The reviewer, a second user, may be invited by the author or may be automatically designated to review the recipe based on a user position or permission.

The recipe data may be modified based on the feedback at step 830. The modifications may include adding notes, changing a status from a draft to accepted or rejected, or some other modification. Modified recipe data may be stored at step 840. It may be stored as part of a menu for a restaurant, and may be searchable through an interface provided by the network service with the present technology. The stored recipe data may be accessed by other users, such as those having a permission to access a particular draft recipe.

Figure 9:
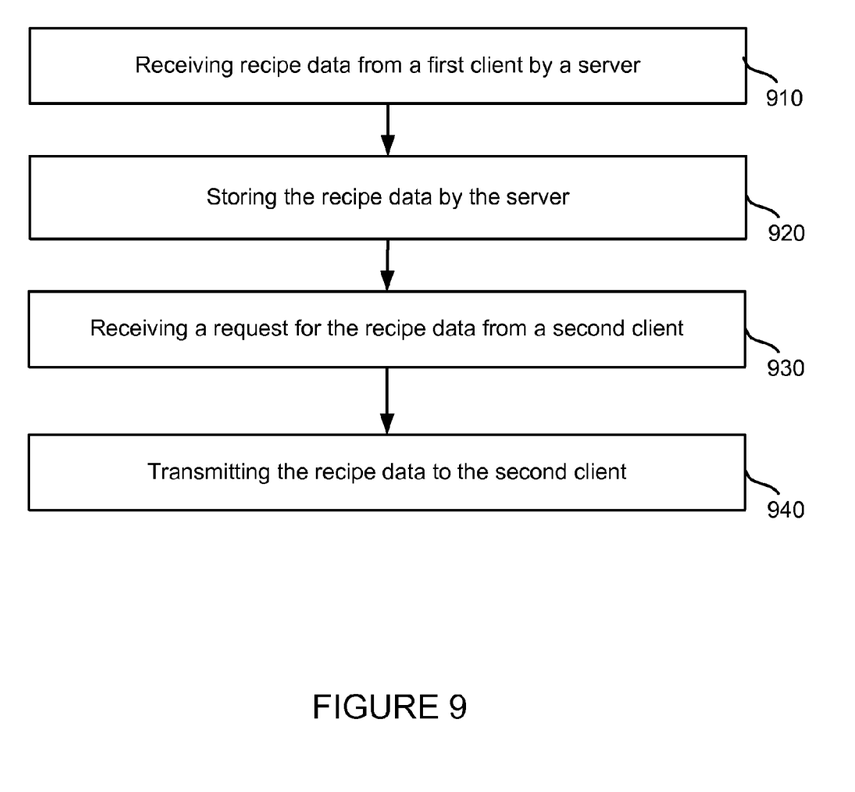
FIG. 9 is an exemplary method for sharing a recipe.

FIG. 9 is an exemplary method for sharing a recipe. Method of FIG. 9 begins with receiving recipe data from a first client by a server at step 910. The client may be associated with a restaurant or user associated with a first restaurant. The recipe may be a draft or an accepted recipe per the recipe creation process of FIG. 8.

The recipe data may be stored by servers at step 920. The recipe data may be stored locally at the server or at a database in communication with the server. A request may then be received for the recipe data from a second client at step 930. The second client may be associated with a second restaurant within a group of restaurants which provide the present technology or the user associated with a second restaurant within the group of restaurants. The recipe data may then be transmitted to the second client at 940. The recipe may be provided through an interface provided by a network service managed by the group of companies.

Figure 10:
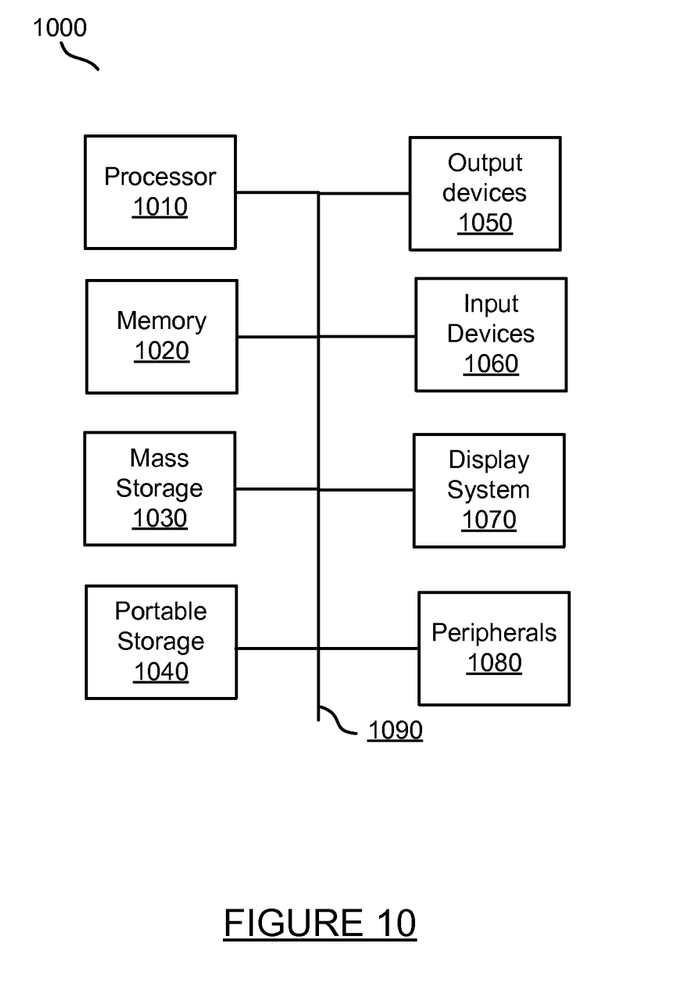
FIG. 10 is a block diagram of a device for implementing the present technology.

FIG. 10 is a block diagram of a device for implementing the present technology. FIG. 10 illustrates an exemplary computing system 1000 that may be used to implement a computing device for use with the present technology. System 1000 of FIG. 10 may be implemented in the contexts of the likes of clients 110-130, application server 150, and data store 160. The computing system 1000 of FIG. 10 includes one or more processors 1010 and memory 1020. Main memory 1020 may store, in part, instructions and data for execution by processor 1010. Main memory can store the executable code when in operation. The system 1000 of FIG. 10 further includes a storage 1030, which may include mass storage and portable storage, antenna 1040, output devices 1050, user input devices 1060, a display system 1070, and peripheral devices 1080.

The components shown in FIG. 10 are depicted as being connected via a single bus 1090. However, the components may be connected through one or more data transport means. For example, processor unit 1010 and main memory 1020 may be connected via a local microprocessor bus, and the storage 1030, peripheral device(s) 1080 and display system 1070 may be connected via one or more input/output (I/O) buses.

Storage device 1030, which may include mass storage implemented with a magnetic disk drive or an optical disk drive, may be a non-volatile storage device for storing data and instructions for use by processor unit 1010. Storage device 1030 can store the system software for implementing embodiments of the present invention for purposes of loading that software into main memory 1010.

Portable storage device of storage 1030 operates in conjunction with a portable non-volatile storage medium, such as a floppy disk, compact disk or Digital video disc, to input and output data and code to and from the computer system 1000 of FIG. 10. The system software for implementing embodiments of the present invention may be stored on such a portable medium and input to the computer system 1000 via the portable storage device.

Antenna 1040 may include one or more antennas for communicating wirelessly with another device. Antenna 1040 may be used, for example, to communicate wirelessly via Wi-Fi, Bluetooth, with a cellular network, or with other wireless protocols and systems. The one or more antennas may be controlled by a processor 1010, which may include a controller, to transmit and receive wireless signals. For example, processor 1010 execute programs stored in memory 1020 to control antenna 1040 transmit a wireless signal to a cellular network and receive a wireless signal from a cellular network.

The system 1000 as shown in FIG. 10 includes output devices 1050 and input device 1060. Examples of suitable output devices include speakers, printers, network interfaces, and monitors. Input devices 1060 may include a touch screen, microphone, accelerometers, a camera, and other device. Input devices 1060 may include an alpha-numeric keypad, such as a keyboard, for inputting alpha-numeric and other information, or a pointing device, such as a mouse, a trackball, stylus, or cursor direction keys.

Display system 1070 may include a liquid crystal display (LCD), LED display, or other suitable display device. Display system 1070 receives textual and graphical information, and processes the information for output to the display device.

Peripherals 1080 may include any type of computer support device to add additional functionality to the computer system. For example, peripheral device(s) 1080 may include a modem or a router.

The components contained in the computer system 1000 of FIG. 10 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 1000 of FIG. 10 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for exchanging recipes between restaurant menus of different restaurants in a restaurant group, the method comprising:

receiving at a server recipe data from a first user having a first permission level within a plurality of restaurants forming a restaurant group, the recipe data associated with a recipe for a menu item of a first menu offered by a first restaurant from the plurality of restaurants;

storing the recipe data in memory of the server;

receiving at the server from a second user a review decision concerning the recipe data submitted by the first user, wherein the second user has a second permission level within the restaurant group, is associated with a second restaurant offering a second menu from the plurality of restaurants forming the restaurant group, and is someone other than the first user who created the recipe data;

receiving at the server from the second user modifications to the recipe data submitted by the first user when the review decision received from the second user is a disapproval of the recipe data;

storing the recipe data in memory for subsequent use in a menu item of the second menu when the review decision received from the second user is an approval of the recipe data;

receiving at the server a request for the recipe data from a third user associated with a third restaurant of the plurality of restaurants offering a third menu, the third user having a third permission level within the restaurant group; and transmitting the recipe data to the third user based on the permission level of the third user.

2. The method of claim 1, wherein the recipe data includes a video associated with the recipe.

3. The method of claim 1, wherein the recipe data includes cost data for recipe ingredients.

4. The method of claim 1, wherein the recipe data includes delivery verbiage.

5. The method of claim 1, wherein the recipe data includes recipe notes.

6. The method of claim 1, wherein the recipe data is received from data entered through a web page.

7. The method of claim 1, further comprising receiving from a plurality of menu reviewers a menu review decision to update the second menu to include a menu item based on the recipe data.

8. The method of claim 7, wherein the second menu is stored in memory and the method further comprises updating the second menu to include a menu item based on the recipe data.

9. The method of claim 7, wherein the menu review decision is based on a plurality of factors.

10. A non-transitory computer-readable storage medium having embodied thereon a program, the program being executable by a processor to perform a method for exchanging recipes between restaurant menus of different restaurants in a restaurant group, the method comprising:

receiving at a server recipe data from a first user having a first permission level within a plurality of restaurants forming a restaurant group, the recipe data associated with a recipe for a menu item of a first menu offered by a first restaurant from the plurality of restaurants;

storing the recipe data in memory of the server;

receiving at the server from a second user a review decision concerning the recipe data submitted by the first user, wherein the second user has a second permission level within the restaurant group, is associated with a second restaurant offering a second menu from the plurality of restaurants forming the restaurant group, and is someone other than the first user who created the recipe data;

receiving at the server from the second user modifications to the recipe data submitted by the first user when the review decision received from the second user is a disapproval of the recipe data;

storing the recipe data in memory for subsequent use in a menu item of the second menu when the review decision received from the second user is an approval of the recipe data;

receiving at the server a request for the recipe data from a third user associated with a third restaurant of the plurality of restaurants offering a third menu, the third user having a third permission level within the restaurant group; and transmitting the recipe data to the third user based on the permission level of the third user.

11. The non-transitory computer-readable storage medium of claim 10, wherein the recipe data includes a video associated with the recipe.

12. The non-transitory computer-readable storage medium of claim 10, wherein the recipe data includes cost data for recipe ingredients.

13. The non-transitory computer-readable storage medium of claim 10, wherein the recipe data includes delivery verbiage.

14. The non-transitory computer-readable storage medium of claim 10, wherein the recipe data includes recipe notes.

15. The non-transitory computer-readable storage medium of claim 10, wherein the recipe data is received from data entered through a web page.

16. The non-transitory computer-readable storage medium of claim 10, further comprising receiving from a plurality of menu reviewers a menu review decision to update the second menu to include a menu item based on the recipe data.

17. The non-transitory computer-readable storage medium of claim 16, wherein the second menu is stored in memory and the method further comprises updating the second menu to include a menu item based on the recipe data.

18. The non-transitory computer-readable storage medium of claim 16, wherein the menu review decision is based on a plurality of factors.

* * * * *